(12) United States Patent
Tilyou et al.

(10) Patent No.: US 6,362,535 B1
(45) Date of Patent: Mar. 26, 2002

(54) METHOD AND APPARATUS FOR AFTER-TREATMENT OF HEV EXHAUST

(75) Inventors: Steven Clare Tilyou, Vestal; Timothy Michael Grewe, Endicott; Peter Frederic Hamilton, Ithaca, all of NY (US)

(73) Assignee: Bae Systems, Johnson City, NY (US)

( * ) Notice: Subject to any disclaimer, the term of this patent is extended or adjusted under 35 U.S.C. 154(b) by 0 days.

(21) Appl. No.: 09/621,767

(22) Filed: Jul. 21, 2000

Related U.S. Application Data

(60) Provisional application No. 60/148,308, filed on Aug. 11, 1999.

(51) Int. Cl.[7] ............................................. F02N 11/06
(52) U.S. Cl. ................................... 290/40 C; 180/65.2
(58) Field of Search ............................ 290/40 A, 40 B, 290/40 D, 40 R, 40 C; 180/65.2, 65.4; 123/3

(56) References Cited

U.S. PATENT DOCUMENTS

| | | | |
|---|---|---|---|
| 5,588,498 A | * 12/1996 | Kitada | 180/65.4 |
| 5,785,137 A | * 7/1998 | Reuyl | 180/65.2 |
| 5,828,201 A | 10/1998 | Hoffman, Jr. et al. | 320/104 |
| 5,869,950 A | 2/1999 | Hoffman, Jr. et al. | 320/103 |
| 5,887,554 A | * 3/1999 | Cohn et al. | 123/3 |
| 5,910,722 A | 6/1999 | Lyons et al. | 320/104 |
| 5,929,595 A | 7/1999 | Lyons et al. | 320/104 |
| 5,941,328 A | 8/1999 | Lyons et al. | 180/65.1 |
| 5,949,210 A | 9/1999 | Gataric et al. | 318/609 |
| 5,950,752 A | 9/1999 | Lyons | 180/65.2 |
| 6,057,605 A | * 5/2000 | Borne et al. | 290/40 C |
| 6,072,287 A | 6/2000 | Gataric | 318/34 |
| 6,091,228 A | 7/2000 | Chady et al. | 320/132 |

* cited by examiner

Primary Examiner—Nicholas Ponomarenko
(74) Attorney, Agent, or Firm—William H. Meise; Geoffrey H. Krauss

(57) ABSTRACT

A vehicle includes an arrangement, such as an internal-combustion engine coupled with a generator, for converting the energy in fuel into electrical form, while generating exhaust. An exhaust cleaning arrangement, such as a catalytic converter, preferably operating at a high temperature, cleanses the exhaust. During deceleration of the vehicle, excess electrical energy is used to heat the exhaust cleaning arrangement.

6 Claims, 1 Drawing Sheet

METHOD AND APPARATUS FOR AFTER-TREATMENT OF HEV EXHAUST

This patent application claims priority of provisional patent application Ser. No. 60/148,308, filed Aug. 11, 1999.

FIELD OF THE INVENTION

This invention relates to vehicle drive systems, and more particularly to low-emission vehicles using converters for converting fuel to mechanical or electrical energy.

BACKGROUND OF THE INVENTION

Vehicular fuel consumption has been very important at least since the early 1970s. The Government has mandated fleet fuel economy standards, and has also mandated vehicular emission standards. In order to accommodate these standards, internal combustion engines have become smaller and more efficient, vehicles have been made lighter, and various improvements have been made to the emission control.

In some regions, local conditions cause vehicular emissions to be concentrated, which has led to more stringent fuel economy and emission control standards. Industry response to these more stringent standards has been to investigate and experiment with electric vehicles. However, the state of technology is not adequate to provide electric automobiles with viable range and cost.

Another avenue of investigation and experimentation includes hybrid electric vehicles, which include both electric motors and sources of electrical power, such as fuel cells and internal-combustion/electric generation. Experimental vehicles are in use in various locations, in which diesel engines coupled to alternators are used to charge a traction battery, and the electrical energy is used to power the vehicle. Such arrangements are described, for example, in U.S. Pat. No. 5,828,201, issued Oct. 27, 1998 in the name of Hoffman, Jr. et al.; U.S. Pat. No. 5,869,950, issued Feb. 9, 1999 in the name of Hoffman, Jr. et al.; U.S. Pat. No. 5,910,722 issued Jun. 8, 1999 in the name of Lyons et al.; U.S. Pat. No. 5,949,210 issued Sep. 7, 1999 in the name of Gataric et al; allowed application Ser. No. 09/192,645, filed Nov. 16, 1998 in the name of Jones et al.; allowed application Ser. No. 09/044,670, filed Mar. 20, 1998 in the name of Lyons et al.; U.S. Pat. No. 5,941,328 issued Aug. 24, 1999 in the name of Lyons et al.; U.S. Pat. No. 5,929,595 issued Jul. 27, 1999 in the name of Lyons et al.; U.S. Pat. No. 5,950,752 issued Sep. 14, 1999 in the name of Lyons; U.S. Pat. No. 6,091,228, issued Jul. 18, 2000 in the name of Chady et al.; application Ser. No. 09/080,148, filed May 18, 1998 in the name of Lyons et al; and U.S. Pat. No. 6,072,287 issued Jun. 6, 2000 in the name of Gataric, and entitled "Polyphase AC Machine Controller".

Improved emission control arrangements are desired.

SUMMARY OF THE INVENTION

A vehicle according to an aspect of the invention includes a fuel-to-electric converter for converting the energy in fuel into electric energy. The fuel-to-electric converter generates an exhaust fluid during operation. An electric machine is coupled to a drive arrangement of the vehicle, for propelling the vehicle when energized by the electric energy, and for generating electrical energy during deceleration. An exhaust cleaning arrangement is coupled to the fuel-to-electric converter, for cleaning the exhaust fluid. The exhaust cleaning arrangement provides improved performance when heated. A control arrangement is coupled to the electric machine and to the exhaust cleaning arrangement, for coupling the electrical energy from the machine to the exhaust cleaning arrangement during the deceleration, for heating the exhaust cleaning arrangement. In a preferred embodiment of the invention, the fuel-to-electric converter includes an internal combustion engine including a driven shaft, and an electrical generator coupled to the shaft. The electrical generator is preferably a multiphase alternator. In a preferred embodiment of the invention, the exhaust cleaning apparatus comprises a catalytic converter. One embodiment of the invention further includes electrical heaters thermally coupled to the exhaust cleaning arrangement and electrically coupled for receiving the electrical energy from the machine, and for heating the exhaust cleaning arrangement. A vehicle according to another aspect of the invention has the exhaust cleaning arrangement coupled to the fuel-to-electric converter by a path for the flow of the fluid exhaust, and has the electrical heaters physically attached to the path for the flow of the fluid exhaust.

A method for operating a vehicle according to an aspect of the invention includes the step of converting the energy contained in fuel into electrical energy by use of a machine which generates a fluid exhaust. The electrical energy is converted into motion of a vehicle during acceleration. During deceleration of the vehicle, energy of motion is converted into deceleration electrical energy. Exhaust is cleaned by means of a temperature-dependent apparatus. Deceleration electrical energy is applied to the apparatus for heating the apparatus.

DESCRIPTION OF THE INVENTION

Figure 1:
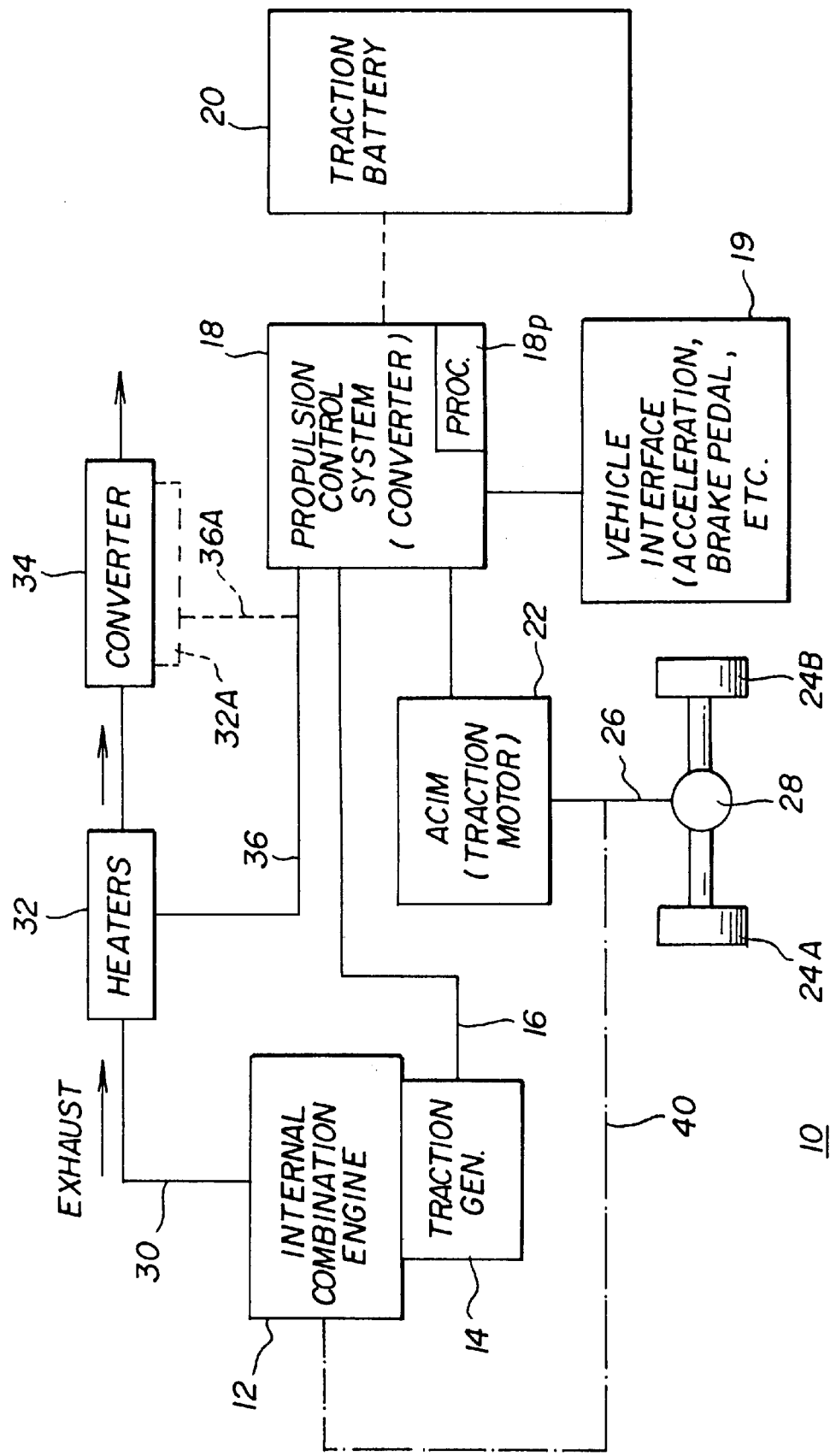
FIG. 1 is a simplified block diagram illustrating a hybrid electric vehicle according to an aspect of the invention.

In FIG. 1, a vehicle 10 includes an internal combustion engine illustrated as a block 12, which in a preferred embodiment of the invention is a diesel engine. Engine 12 is mechanically connected to drive an electrical generator in the form of an alternator 14. Alternator 14 generates alternating voltage, as known in the art, in response to rotational drive. Electrical energy produced by alternator 14 is applied by way of a path 16 to a Propulsion Control System 18. Propulsion Control System 18 includes a multiphase converter, which controllably bidirectionally converts alternating current to direct current, as described in one or more of the abovementioned patents, allowed application, and applications. Direct current produced by converter 18 is applied to charge traction batteries 20. Converter 18 can also couple alternating voltage from alternator 14 to the traction motor 22, or convert direct voltage from traction battery 20 into alternating voltage for driving motor 22. Traction motor 22 drives vehicle wheels illustrated as 24a and 24b by way of a mechanical connection 26, which may include a differential gear arrangement 28. A control processor (proc) 18p is illustrated as being located in the propulsion control system 18, provides control laws which meld control commands from a vehicle interface 19 with sensor signals representing the operating conditions of the vehicle and its important parts, to provide appropriate combinations of electrical power generation, storage, acceleration, velocity, and the like, in known fashion.

Also in FIG. 1, the exhaust from internal combustion engine 12 is routed by way of a pipe 30 and a heater 32 to a catalytic converter 34. Catalytic converter 34 operates in known fashion to catalyze exhaust products, to render them innocuous, or to convert them into byproducts such as carbon dioxide and water. In a particular embodiment of the invention, the converter 34 includes a soot filter as part of the structure. During use, soot or particulate matter from the engine enters the catalytic converter/filter, and is catalyzed as it passes through the converter. Particulate matter in the exhaust tends to clog the filter apertures. In normal operation of a catalytic converter, it generates heat, which aids in converting the particulate matter into gaseous matter. However, in mobile applications, it has been found that soot buildup tends to reduce the effectiveness of the converter.

According to an aspect of the invention, excess energy made available during regenerative braking, which cannot be used to charge the batteries, is directed to the catalytic converter, to tend to raise the temperature of the converter, to thereby aid in converting particulate matter into gaseous matter, to thereby tend to clean the soot from the converter. In the context of a non-diesel internal combustion engine, in which soot buildup is not a problem, the higher temperature attainable by the catalytic converter tends to reduce emission of oxides of nitrogen and carbon monoxide. It should be noted that the exhaust temperature of an internal combustion engine, such as a diesel engine, tends to be lower during intervals in which the engine is lightly loaded by comparison with those intervals in which the engine is under heavy load.

In FIG. 1, an electrical connection 36 couples heater 32 to converter 18, so that electrical energy can be coupled from traction machine 22 operating as a generator, to the heaters. The heaters 32 may be ordinary resistive heaters, well known in the art, which, when heated by application of electrical power, heat the exhaust gas stream flowing through the heater. The heating of the exhaust gas stream, in turn, tends to heat the catalytic converter 34 to a temperature higher than that which it might otherwise assume.

In operation of the arrangement of FIG. 1, the converter 18 is controlled so that, during regenerative braking, excess energy which cannot be coupled to the traction battery, because the batteries are at or near their nominal fully-charged state, is coupled instead to the heater 32. This, as mentioned, heats the exhaust stream. A particular advantage of the described arrangement is that the heating of the exhaust stream during regenerative braking occurs at precisely the time at which the engine is lightly loaded, and during which the exhaust gas temperature of the engine is low.

Other embodiments of the invention will be apparent to those skilled in the art. For example, the electrical heaters may be thermally coupled directly to the converter as suggested in FIG. 1 by the alternative (or additional) heater location 32A, which may be powered from the converter 18 by way of path 36A. Also, the arrangement according to the invention may also be used in those cases in which an additional "parallel" mechanical drive, illustrated as mechanical path 40, connects the internal combustion engine 12 to drive wheels 24a, 24b. Naturally, path 40 may include clutches, transmission gears, and the like. While the controlling processor 18p has been described as being located within the multiphase AC-to-DC converter 18, those skilled in the art will recognize that the processing may be done anywhere within the vehicle, and that the processing may even be distributed, so that it has no cognizable "location."

Thus, a vehicle (10) according to an aspect of the invention includes a fuel-to-electric converter (12, 14) for converting the energy in fuel into electric energy. The fuel-to-electric converter (12, 14) generates an exhaust fluid during operation. An electric machine (22) is coupled to a drive arrangement (24a, 24b, 26, 28) of the vehicle (10), for propelling the vehicle (10) when energized by the electric energy, and for generating electrical energy during deceleration. An exhaust cleaning arrangement (34) is coupled to the fuel-to-electric converter (12, 14), for cleaning the exhaust fluid. The exhaust cleaning arrangement (34) provides improved performance when heated. A control arrangement (18, 18p) is coupled to the electric machine (22) and to the exhaust cleaning arrangement (34), for coupling the electrical energy from the machine (22) to the exhaust cleaning arrangement (34) during the deceleration, for heating the exhaust cleaning arrangement (34). In a preferred embodiment of the invention, the fuel-to-electric converter (12, 14) includes an internal combustion engine including a driven shaft, and an electrical generator coupled to the shaft. The electrical generator is preferably a multiphase alternator. In a preferred embodiment of the invention, the exhaust cleaning apparatus comprises a catalytic converter. One embodiment of the invention further includes electrical heaters (36, 36A) thermally coupled to the exhaust cleaning arrangement (34) and electrically coupled (by path 36, 36A) for receiving the electrical energy from the machine (22), and for heating the exhaust cleaning arrangement (34). A vehicle (10) according to another aspect of the invention has the exhaust cleaning arrangement (34) coupled to the fuel-to-electric converter (12, 14) by a path (30, 32) for the flow of the fluid exhaust, and has the electrical heaters physically attached to the path for the flow of the fluid exhaust.

A method for operating a vehicle (10) according to an aspect of the invention includes the step of converting the energy contained in fuel into electrical energy by use of a machine which generates a fluid exhaust. The electrical energy is converted into motion of a vehicle (10) during acceleration. During deceleration of the vehicle (10), energy of motion is converted into deceleration electrical energy. Exhaust is cleaned by means of a temperature-dependent apparatus. Deceleration electrical energy is applied to the apparatus for heating the apparatus.

What is claimed is:

1. A vehicle, comprising:
 a converting apparatus for converting the energy in fuel into electric energy, said apparatus generating an exhaust fluid during operation;
 an electric machine coupled to a drive arrangement of said vehicle, for propelling said vehicle when energized by said electric energy, and for generating electrical energy during deceleration;
 an exhaust cleaning arrangement coupled to said converting apparatus, for cleaning said exhaust fluid, said exhaust cleaning arrangement providing improved performance when heated; and
 control means coupled to said electric machine and to said exhaust cleaning arrangement, for coupling said electrical energy from said machine to said exhaust cleaning arrangement during said deceleration, for heating said exhaust cleaning arrangement.

2. A vehicle according to claim 1, wherein said converting apparatus comprises:
 an internal combustion engine including a driven shaft; and
 an electrical generator coupled to said shaft.

3. A vehicle according to claim 1, wherein said exhaust cleaning apparatus comprises a catalytic converter.

4. A vehicle according to claim 1, further comprising electrical heaters thermally coupled to said exhaust cleaning arrangement and electrically coupled for receiving said electrical energy from said machine, and for heating exhaust cleaning arrangement.

5. A vehicle according to claim 4, wherein:

said exhaust cleaning arrangement is coupled to said converting apparatus by a path for the flow of said fluid exhaust; and said electrical heaters are physically attached to said path for the flow of said fluid exhaust.

6. A method for operating a vehicle, said method comprising the steps of:

converting the energy in fuel into electrical energy by use of a machine which generates a fluid exhaust:

converting said electrical energy into motion of a vehicle during acceleration;

during deceleration of said vehicle, converting energy of motion into deceleration electrical energy;

cleaning said exhaust by means of a temperature-dependent apparatus; and applying said deceleration electrical energy to said apparatus for heating said apparatus.

* * * * *